UNITED STATES PATENT OFFICE 2,430,708

REACTION PRODUCTS OF ALDEHYDES AND TRIAZINE DERIVATIVES

Gaetano F. D'Alelio, Pittsfield, Mass., assignor to General Electric Company, a corporation of New York No Drawing. Application August 12, 1942, Serial No. 454,617

3 Claims. (Cl. 260—51)

This invention relates to the production of new synthetic materials and more particularly to new reaction products of particular utility in the plastics and coating arts. Specifically the invention is concerned with compositions of matter comprising a condensation product of ingredients comprising an aldehyde, including polymeric aldehydes, hydroxyaldehydes and aldehyde-addition products, e. g., formaldehyde, paraformaldehyde, aldol, glucose, dimethylol urea, trimethylol melamine, etc., and a triazine derivative corresponding to the following general formula:

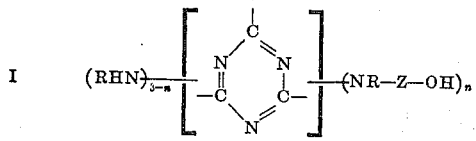

In the above formula $n$ represents an integer and is at least 1 and not more than 3, R represents a member of the class consisting of hydrogen and monovalent hydrocarbon and substituted hydrocarbon radicals, more particularly halo-hydrocarbon (halogenated hydrocarbon) radicals, and Z represents a member of the class consisting of divalent aromatic and substituted aromatic hydrocarbon radicals, more particularly halo-aromatic (halogenated aromatic) hydrocarbon radicals. From the foregoing formula it will be noted that when $n$ is 3, there will be no —NHR groups attached to the triazine nucleus.

Illustrative examples of monovalent radicals that R in the above formula may represent are: aliphatic (e. g., methyl, ethyl, propyl, isopropyl, butyl, secondary butyl, isobutyl, butenyl, amyl, isoamyl, hexyl, octyl, allyl, methallyl, crotyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, cinnamyl, phenylethyl, phenylpropyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals that R in the above formula may represent are: chloromethyl, chloroethyl, chlorophenyl, ethyl chlorophenyl, dichlorophenyl, chlorocyclohexyl, phenyl chloroethyl, bromoethyl, bromopropyl, fluorophenyl, iodophenyl, bromo tolyl, etc. Preferably R is hydrogen. However, there also may be used in carrying the present invention into effect compounds such, for instance, as those represented by the general formulas:

II

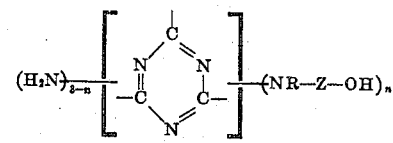

and

III

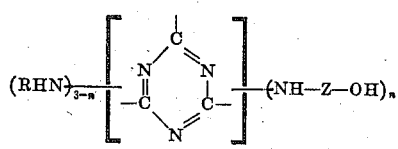

where $n$, R and Z have the same meanings as given above with reference to Formula I.

Illustrative examples of divalent radicals that Z in Formulas I, II and III may represent are: phenylene, xenylene, naphthylene, tolylenes, e. g., 2,5-tolylene, etc., xylylenes, e. g., para-(2,3-xylylene), etc., ethylphenylenes, propylphenylenes, butylphenylenes, allylphenylenes, methallylphenylenes, propenylphenylenes and other aliphatic-substituted phenylenes, the aliphatic-substituted naphthylenes, e. g., the mono-, di- and tri-methyl naphthylenes, the mono-, di- and tri-ethyl naphthylenes, the mono-, di- and tri-propyl naphthylenes, etc., the aromatic-substituted naphthylenes, e. g., the phenyl naphthylenes, etc., divalent aromatic radicals wherein one or more of the hydrogen atoms thereof are replaced by a substituent, e. g., halogeno, amino, acetyl, acetoxy, alkoxy, aryloxy, carboalkoxy, carboaroxy, sulfamyl, a hydroxy group or groups in addition to the single —OH group shown in the above formulas, an alkyl or alkenyl group or groups other than those specifically mentioned in the arylene radicals above set forth by way of illustration, etc. More specific examples of divalent, substituted aromatic hydrocarbon radicals are chlorophenylene, bromophenylene, chloronaphthylene, bromonaphthylene, bromo 2,5-tolylene, carbomethoxyphenylene, ethoxyphenylene, acetophenylene, acetoxyphenylene, aminophenylene, phenoxyphenylene, phenoxytolylene, sulfamylphenylene, methylphenylene (tolylene), etc. Preferably Z is phenylene or tolylene.

Instead of the symmetrical triazines (s-triazines) represented by the above formulas, corresponding derivatives of the asymmetrical triazines or of the vicinal triazines may be used.

The triazine derivatives that are employed in carrying the present invention into effect are more fully described and are specifically claimed in my copending application Serial No. 453,716, filed August 5, 1942, and assigned to the same assignee as the present invention. As pointed out in this copending application, a method of preparing the triazine derivatives used in practicing the present invention comprises effecting reaction between (1) a 2,4,6-triamino [(—NHR)₃] 1,3,5-triazine (s-triazine) and (2) an amino hydroxy aromatic hydrocarbon corresponding to the formula $nH_2N$—Z—OH where $n$, Z and R have the same meanings as given above with reference to Formula I. This reaction preferably is carried out in an inert organic solvent having a boiling point above 150° C., for example diethylene glycol.

Among the triazine derivatives embraced by Formula I that may be used in producing the new condensation products of the present invention are the tri-(hydroxyarylamino) s-triazines, the tri-(hydroxy-halogenoaryl amino) s-triazines, the monoamino (—NHR) di-hydroxyarylamino) s-triazines, the monoamino (—NHR) di-(hydroxy-halogenoaryl amino) s-triazines, the diamino [(—NHR)₂] mono-(hydroxyarylamino) s-triazines and the diamino [(—NHR)₂] mono-(hydroxy-halogenoaryl amino) s-triazines. More specific examples of triazine derivatives that may be employed in practicing my invention are listed below:

Ortho-hydroxyphenylamino diamino s-triazine, which also may be named 2-(ortho-hydroxyphenylamino) 4,6-diamino s-triazine, 4-ortho-hydroxyphenylamino) 2,6-diamino s-triazine or 6-(ortho-hydroxyphenylamino) 2,4-diamino s-triazine
Meta-hydroxyphenylamino diamino s-triazine
Ortho-hydroxyphenylamino diamino s-triazine
Hydroxytolylamino diamino s-triazines
Di-(hydroxytolylamino) amino s-triazines
Tri-(hydroxytolylamino) s-triazines
Di-(ortho-hydroxyphenylamino) amino s-triazine
Di-(meta-hydroxyphenylamino) amino s-triazine
Di-(para-hydroxyphenylamino) amino s-triazine
Tri-ortho-hydroxyphenylamino) s-triazines
Tri-(meta-hydroxyphenylamino) s-triazines
Tri-(para-hydroxyphenylamino) s-triazines
Para-hydroxyphenylamino di-(methylamino) s-triazine
Hydroxytolylamino di(octylamino) s-triazines
Hydroxytolylamino di-(cyclopentylamino) s-triazines
Di-(hydroxytolylamino) methylamino s-triazines
Ortho-hydroxyphenylamino di-(ethylamino) s-triazine
Meta-hydroxyphenylamino di-(allylamino) s-triazine
Para-hydroxyphenylamino di-(cyclohexylamino) s-triazine
Hydroxytolylamino di-(chloroanilino) s-triazines
(Hydroxy-chlorophenyl amino) diamino s-triazines
2-(para-hydroxyphenylamino) 4-ethylamino 6-amino s-triazine
Para-hydroxyphenylamino di-(ethylamino) s-triazine
2-(para-hydroxyphenylamino) 4-methylamino 6-anilino s-triazine
Alpha-hydroxynaphthylamino di-(ethylamino) s-triazine
Meta-hydroxyphenylamino di-(naphthylamino) s-triazine
Hydroxytolylamino di-(chloroethylamino) s-triazines
Hydroxyxylidino di-(chloroanilino) s-triazines
Hydroxyphenylamino di-(propylamino) s-triazines
Hydroxyphenylamino di-(butenylamino) s-triazines
Hydroxyxylidino diamino s-triazines
Hydroxynaphthylamino diamino s-triazines
Hydroxyxenylamino diamino s-triazines
Di-(hydroxyxylidino) amino s-triazines
Di-(hydroxynaphthylamino) amino s-triazines
Di-(hydroxyxenylamino) amino s-triazines
Tri-(hydroxyxylidino) s-triazines
Tri-(hydroxyxenylamino) s-triazines
Tri-(hydroxynaphthylamino) s-triazines
Di-(hydroxyphenylamino) ethylamino s-triazines
Di-(hydroxytolylamino) ethylamino s-triazines
Di-(hydroxynaphthylamino) allylamino s-triazines
Di-(hydroxyphenylamino) fluoroanilino s-triazines
(Hydroxy-bromophenyl amino) diamino s-triazines
Di-(hydroxyphenylamino) heptylamino s-triazines
Di-(hydroxy-chlorophenyl amino) amino s-triazines
Di-(hydroxy-bromophenyl amino) amino s-triazines
Tri-(hydroxy-chlorophenyl amino) s-triazines
Tri-(hydroxy-bromophenyl amino) s-triazines
Hydroxyphenylamino di-(bromotoluido) s-triazines
Di-(hydroxytolylamino) cyclohexenylamino s-triazines
Di-(hydroxynaphthylamino) iodoanilino s-triazines
Hydroxyphenylamino di-(phenethylamino) s-triazines
Hydroxytolylamino di-(benzylamino) s-triazines
2-(hydroxyphenylamino) 4-methylamino 6-ethylamino s-triazines
2-(hydroxytolylamino) 4-anilino 6-naphthylamino s-triazines
2-(hydroxyphenylamino) 4-methylamino 6-allylamino s-triazines
2-(hydroxytolylamino) 4-amino 6-cyclohexylamino s-triazines
2-(hydroxyphenylamino) 4-methylamino 6-chloroethylamino s-triazines The present invention is based on my discovery that new and valuable materials of particular utility in the plastics and coating arts can be produced by effecting reaction between ingredients comprising essentially an aldehyde, including polymeric aldehydes, hydroxyaldehydes and aldehyde-addition products, and a triazine derivative of the kind embraced by Formula I, numerous examples of which have been given above and in the above-identified copending application.

Resins heretofore have been made by condensing an aldehyde with an aminotriazine, specifically melamine. The suggestion also has been made that resinous materials be prepared by condensing an aliphatic aldehyde containing a chain of at the most six carbon atoms with compounds of the general formula

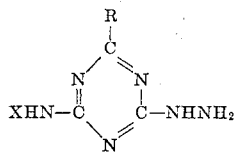

wherein X stands for a member of the group consisting of hydrogen and NH₂, and R represents a member of the class consisting of hydrazino, phenyl, hydroxy, alkoxy and thioether groups and halogen atoms. Such resins usually have excellent heat and water resistance, but are deficient in other properties that are desirable in a resin to be used in the production of molding compositions and molded articles. Resinous reaction products of an aldehyde with an amino hydroxy aromatic hydrocarbon, e. g., an aminophenol, on the other hand, usually have much better flow characteristics than the aminotriazine-aldehyde resins, specifically melamine - formaldehyde resins, but are less resistant to water and cure more slowly. The resinous condensation products of the present invention have a high water resistance and a rate of cure approximating that of the known aminotriazine-aldehyde resins plus the improved flow characteristics of the resinous reaction products of an aldehyde with an amino hydroxy aromatic hydrocarbon. The color and arc resistance of my new resins are, in general, likewise much better than that of resins prepared by condensing an aldehyde with an amino hydroxy aromatic hydrocarbon, e. g., an aminophenol.

Thus it is seen that the present invention provides a resinous composition which has combined therein the desirable properties of the conventional aminotriazine-aldehyde and aminophenol-aldehyde resins without sacrifice of other useful properties. This is a surprising and unexpected result that in no way could have been predicted. Because of the unique properties of the resins of this invention, they are suitable for molding and other applications for which the ordinary aminotriazine-aldehyde and aminophenol-aldehyde resins, as well as other resins of the aminoplast type, e. g., urea-aldehyde resins, are unsuited.

In practicing my invention the initial condensation reaction may be carried out at normal or at elevated temperatures, at atmospheric, sub-atmospheric or super-atmospheric pressures and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, I may use an alkaline substance such as sodium, potassium or calcium hydroxides, sodium or potassium carbonates, mono-, di- or tri-amines, etc. In some cases it is desirable to cause the initial condensation reaction between the components to take place in the presence of a primary condensation catalyst and a secondary condensation catalyst. The primary catalyst advantageously is either an aldehyde - non - reactable nitrogen - containing basic tertiary compound, e. g., tertiary amines such as trialkyl (e. g., trimethyl, triethyl, etc.) amines, triaryl (e. g., triphenyl, tritolyl, etc.) amines, etc., or an aldehyde-reactable nitrogen-containing basic compound, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, advantageously is a fixed alkali, for instance a carbonate, cyanide or hydroxide of an alkali metal (e. g., sodium, potassium, lithium, etc.).

Illustrative examples of acid condensation catalysts that may be employed are inorganic or organic acids such as hydrochloric, sulfuric, phosphoric, acetic, lactic, acrylic, malonic, etc., or acid salts such as sodium acid sulfate, monosodium phosphate, monosodium phthalate, etc. Mixtures of acids, of acid salts or of acids and of acid salts may be employed if desired.

The reaction between the aldehyde, e. g., formaldehyde, and the triazine derivative may be carried out in the presence or absence of solvents or diluents, other natural or synthetic resinous bodies, or while admixed with other materials that also can react with the aldehydic reactant or with the triazine derivative, e. g., urea (NH₂CONH₂), thiourea, selenourea, iminourea (guanidine), substituted ureas, thioureas, selenoureas and iminoureas, e. g., urea derivatives such as mentioned in my Patent No. 2,285,418, issued June 9, 1942, page 1, column 1, lines 40–49; monoamides of monocarboxylic and polycarboxylic acids and polyamides of polycarboxylic acids, e. g., acetamide, halogenated acetamides (e. g., a chlorinated acetamide), maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; aldehyde-reactable triazines other than the triazine derivatives constituting the primary components of the resins of the present invention, e. g., melamine, ammeline, ammelide, melem, melam, melon, numerous other examples being given in various copending applications of mine, for instance in my copending application Serial No. 377,524, filed February 5, 1941, and in applications referred to in said copending application; phenol and substituted phenols, e. g., the cresols, the xylenols, the tertiary alkyl phenols and other phenols such as mentioned, for example, in my Patent No. 2,239,441, issued April 22, 1941, monohydric and polyhydric alcohols, e. g., butyl alcohol, amyl alcohol, heptyl alcohol, octyl alcohol, 2-ethyl-butyl alcohol, ethylene glycol, propylene glyco, gycerine, polyvinyl alcohol, etc.; amines, including aromatic amines, e. g., aniline, etc.; and the like.

The modifying reactants may be incorporated with the triazine derivative and the aldehyde to form an intercondensation-product by mixing all the reactants and effecting condensation therebetween or by various permutations of reactants as described, for example, in my Patent No. 2,281,559, issued May 5, 1942 (page 2, column 1, lines 49–69), with particular reference to reactions involving a non-haloacylated urea, a halogenated acylated urea and an aliphatic aldehyde. For instance, I may form a partial condensation product of ingredients comprising (1) urea or melamine or urea and melamine, (2) a triazine derivative of the kind embraced by Formula I, for example an ortho-, meta- or para-hydroxyphenylamino diamino s-triazine, a di- (ortho-, meta- or para-hydroxyphenylamino) amino s-triazine, a tri-(ortho-, meta- or para-hydroxyphenylamino) s-triazine, a hydroxy-tolylamino diamino s-triazine, a di-(hydroxy-tolylamino) amino s-triazine, a tri-(hydroxy-tolylamino) s-triazine, a (hydroxy-chlorophenyl amino) diamino s-triazine, etc., and (3) an aldehyde, including polymeric aldehydes, hydroxy-aldehydes and aldehyde-addition products, for instance formaldehyde, paraformaldehyde, glyceraldehyde, dimethylol urea, a polymethylol melamine, etc. Thereafter I may effect reaction between this partial condensation product and, for example, a curing reactant, specifically a chlorinated acetamide, to obtain a heat-curable composition.

Some of the condensation products of this invention are thermoplastic materials even at an advanced stage of condensation, while others are thermosetting or potentially thermosetting bodies that convert under heat or under heat and pressure to an insoluble, infusible state. The thermoplastic condensation products are of particular value as plasticizers for other synthetic resins. The thermosetting or potentially thermosetting resinous condensation products, alone or mixed with fillers, pigments, dyes, lubricants, plasticizers, curing agents, etc., may be used, for example, in the production of molding compositions.

The liquid intermediate condensation products of the invention may be concentrated or diluted further by the removal or addition of volatile solvents to form liquid coating compositions of adjusted viscosity and concentration. The heat-convertible or potentially heat-convertible resinous condensation products may be used in liquid state, for instance as surface-coating materials, in the production of paints, varnishes, lacquers, enamels, etc., for general adhesive applications, in producing laminated articles and for numerous other purposes. The liquid heat-hardenable or potentially heat-hardenable condensation products may be used directly as casting resins, while those which are of a gel-like nature in partially condensed state may be dried and granulated to form clear, unfilled heat-convertible resins.

In order that those skilled in the art better may understand how the present invention may be carried into effect, the following examples are given by way of illustration and not by way of limitation. All parts are by weight.

*Example 1*

| | Parts |
|---|---|
| Para-hydroxyphenylamino diamino s-triazine | 43.6 |
| Aqueous formaldehyde (approx. 37.1% HCHO) | 48.6 |
| Aqueous ammonia (approx. 28% NH$_3$) | 2.0 |
| Sodium hydroxide in a small amount of water | 0.1 | were heated together under reflux at the boiling temperature of the mass for 15 minutes, yielding a viscous, resinous syrup. When a sample of this syrup was heated on a 140° C. hot plate it cured slowly to an insoluble and infusible state. The main portion of the syrupy condensation product was mixed with 0.5 part cloroacetamide (monochloroacetamide), 30 parts alpha cellulose in flock form and 0.2 part of a mold lubricant, specifically zinc stearate, to form a molding (moldable) composition. The wet molding compound was dried for 1 hour at 64° C. A sample of the dried and ground molding composition was molded for a few minutes at 130° C. under a pressure of 2,000 pounds per square inch, yielding a well-cured molded piece having a homogeneous and well-knit structure. The molding compound showed very good plastic flow during molding.

Instead of using chloroacetamide in accelerating the curing of the potentially reactive resinous material, heat-convertible compositions may be produced by adding to the partial condensation product (in syrupy or other form) direct or active curing catalysts (e. g., citric acid, phthalic anhydride, malonic acid, oxalic acid, etc.), or latent curing catalysts (e. g., sodium chloroacetate, N-diethyl chloroacetamide, glycine ethyl ester hydrochloride, etc.), or by intercondensation with curing reactants other than monochloroacetamide (e. g., di- and tri-chloroacetamides, chloroacetonitriles, alpha, beta-dibromopropionitrile, aminoacetamide hydrochloride, ethylene diamine monohydrochloride, the ethanolamine hydrochlorides, nitrourea, chloroacetyl urea, chloroacetone, glycine, sulfamic acid, citric diamide, phenacyl chloride, etc.). Other examples of curing reactants that may be employed to accelerate or to effect the curing of the thermosetting or potentially thermosetting resins of this and other examples are given in various copending applications of mine, for instance in my copending applications Serial No. 346,962, filed July 23, 1940, now Patent No. 2,325,375, and Serial No. 354,395, filed August 27, 1940, now Patent No. 2,325,376, both of which applications issued on July 27, 1943, and are assigned to the same assignee as the present invention.

*Example 2*

| | Parts |
|---|---|
| Para-hydroxyphenylamino diamino s-triazine | 21.8 |
| Urea | 54.0 |
| Aqueous formaldehyde (approx. 37.1% HCHO) | 162.0 |
| Aqueous ammonia (approx. 28% NH$_3$) | 7.5 |
| Sodium hydroxide in a small amount of water | 0.2 |
| Chloroacetamide | 1.0 |

All of the above ingredients with the exception of the chloroacetamide were heated together under reflux at the boiling temperature of the mass for 30 minutes. The resulting resinous syrup was mixed with 70 parts alpha cellulose and 0.4 part zinc stearate to form a molding compound. The wet molding composition was dried for 2½ hours at 64° C. A well-cured molded piece having a homogeneous and well-knit structure was produced by molding a sample of the dried and ground molding compound for 5 minutes at 130° C. under a pressure of 2,000 pounds per square inch. The molding composition showed very good flow characteristics during molding.

*Example 3*

| | Parts |
|---|---|
| Phenol, synthetic | 45.0 |
| Aqueous formaldehyde (approx. 37.1% HCHO) | 97.5 |
| Potassium carbonate in 20 parts water | 1.43 |
| Para-hydroxyphenylamino diamino s-triazine | 4.5 |

A phenol-formaldehyde partial condensation product was produced by heating the above-stated amounts of phenol and formaldehyde together in the presence of the stated amount of potassium carbonate at 65 to 70° C. for 3½ hours in a reaction vessel provided with a reflux condenser. The triazine derivative was added to the syrupy phenol-formaldehyde partial condensation product and the resulting mixture was heated under reflux for 1 hour. The syrupy condensation product produced in this manner was acidified by the addition of 2.5 parts oxalic acid dissolved in a small amount of water. A molding compound was made from this acidified syrup by mixing therewith 57 parts alpha cellulose and 0.6 part zinc stearate. The wet molding compound was dried for 2 hours at 64° C. A sample of the dried and ground molding compound was molded for 5 minutes at 130° C. under a pressure of 2,000 pounds per square inch. The molded piece was light in color and was well cured throughout. It had a good surface finish and very good resistance to water. The molding composition showed excellent flow characteristics during molding.

*Example 4*

| | Parts |
|---|---|
| Para-hydroxyphenylamino diamino s-triazine | 21.8 |
| Furfural | 28.8 |
| Sodium hydroxide in 10 parts water | 0.1 | were heated together under reflux at the boiling temperature of the mass for 15 minutes. When a sample of the resulting syrupy condensation product was heated on a 140° C. hot plate, it converted slowly to an insoluble and infusible state. The addition of chloroacetamide, sulfamic acid, citric acid, oxalic acid or other curing agent such as mentioned under Example 1 to the viscous resin increased the rapidity of cure of the resin. The cured resin possessed exceptional resistance to water and organic solvents. The resinous composition of this example may be used in the production of molding compounds.

*Example 5*

| | Parts |
|---|---|
| Para-hydroxyphenylamino diamino s-triazine | 21.8 |
| Acrolein | 16.8 |
| Sodium hydroxide in 10 parts water | 0.1 | were heated together under reflux for 15 minutes, yielding a very viscous resin. This resin cured slowly to an infusible state when a sample of it was heated on a 140° C. hot plate. The addition of curing agents such as mentioned under Example 1, for example, sulfamic acid, glycine, nitrourea, etc., accelerated the cure of the resin to the insoluble and infusible state. The cured resin showed outstanding resistance to water.

*Example 6*

| | Parts |
|---|---|
| Para-hydroxyphenylamino diamino s-triazine | 21.8 |
| Butyl alcohol | 74.0 |
| Aqueous formaldehyde (approx. 37.1% HCHO) | 64.8 |
| Sodium hydroxide in a small amount of water | 0.1 | were heated together under reflux at the boiling temperature of the mass for 15 minutes. The resulting resinous syrup bodied to a thermoelastic resin when a sample of it was heated on a 140° C. hot plate. This resin was soluble in Solvatone but was insoluble in water and ethyl alcohol. The resin was potentially heat-curable as shown by the fact that when sulfamic acid, citric acid, chloral urea, phenacyl chloride or other curing agent such as mentioned under Example 1 was added either to the syrupy condensation product or to the thermoelastic resin, followed by heating on a 140° C. hot plate, the resin cured to an insoluble and infusible state. The resinous material of this example is particularly suitable for use in the preparation of liquid coating compositions.

*Example 7*

| | Parts |
|---|---|
| Para-hydroxyphenylamino diamino s-triazine | 21.8 |
| Diethyl malonate | 16.0 |
| Aqueous formaldehyde (approx. 37.1% HCHO) | 40.5 |
| Sodium hydroxide in a small amount of water | 0.1 | were heated together under reflux at boiling temperature for 15 minutes, yielding a viscous resin that was potentially heat-curable. When a sample of the resin was treated with a small amount of a curing agent such as mentioned under Example 1, followed by heating on a 140° C. hot plate, the resin cured rapidly to an insoluble and infusible state. The unmodified resin was slightly soluble in Solvatone and hydrocarbon solvents but was insoluble in water and alcohols.

*Example 8*

| | Parts |
|---|---|
| Para-hydroxyphenylamino diamino s-triazine | 21.8 |
| Acetamide | 5.9 |
| Aqueous formaldehyde (approx. 37.1% HCHO) | 32.4 |
| Sodium hydroxide in a small amount of water | 0.1 | were heated together under reflux at the boiling temperature of the mass for 30 minutes, yielding a viscous syrup that was converted into a thermoplastic resin when a small sample of it was heated on a 140° C. hot plate. This thermoplastic resin was convertible into a thermosetting resin by incorporating therein sulfamic acid, citric diamide, phenacyl chloride or other curing agent such as mentioned under Example 1. When a sample of the thermosetting resin produced in this manner was heated on a 140° C. hot plate, it cured to an insoluble and infusible state and showed an extended plastic flow during curing. This extended flow during curing indicated that the resin would be particularly suitable for use as a plasticizer of less plastic resins to improve their plasticity or flow characteristics.

*Example 9*

| | Parts |
|---|---|
| Para-hydroxyphenylamino diamino s-triazine | 21.8 |
| Glycerine | 9.2 |
| Aqueous formaldehyde (approx. 37.1% HCHO) | 40.5 |
| Sodium hydroxide in a small amount of water | 0.1 | were heated together under reflux at boiling temperature for 30 minutes. When a sample of the resulting syrupy condensation product was heated on a 140° C. hot plate it bodied to a thermoplastic resin. The addition of curing agents such as mentioned under Example 1 either to the syrup or to the thermoplastic resin, followed by heating on a 140° C. hot plate, caused the material to cure to an insoluble and infusible state.

Example 10

| | Parts |
|---|---|
| Para-hydroxyphenylamino diamino s-triazine | 21.8 |
| Polyvinyl alcohol | 26.4 |
| Aqueous formaldehyde (approx. 37.1% HCHO) | 129.6 |
| Sodium hydroxide in a small amount of water | 0.1 | were heated together under reflux at boiling temperature for 30 minutes. When a sample of the resulting syrup was heated on a 140° C. hot plate it was converted into a clear, thermoplastic resin. The addition of a small amount of a curing agent, for example hydrochloric acid, to the syrupy condensation product yielded a thermosetting material. When a sample of this thermosetting composition was heated on a 140° C. hot plate, it cured rapidly to an insoluble and infusible state. The cured resin showed exceptional toughness and resistance to water. Instead of hydrochloric acid other curing agents such as mentioned under Example 1 may be employed to improve the curing characteristics and the water resistance of the resinous material of this example. The thermoplastic resinous product, either with or without a curing agent, may be used in the preparation of various liquid coating and impregnating compositions. The thermosetting resins may be employed in the production of molding compounds and molded articles.

It will be understood, of course, by those skilled in the art, that the reaction between the aldehyde and the triazine derivative may be effected at temperatures ranging, for example, from room temperature to the fusion or boiling temperature of the mixed reactants or of solutions of the mixed reactants, the reaction proceeding more slowly at normal temperatures than at elevated temperatures in accordance with the general law of chemical reactions. Thus, instead of effecting reaction between the ingredients of the above examples under reflux at the boiling temperature of the mass, the reaction between the components may be carried out at lower temperatures, for example at temperatures ranging from room temperature to a temperature near the boiling temperature using longer reaction periods and, in some cases, stronger catalysts and higher catalyst concentrations.

It also will be understood by those skilled in the art that my invention is not limited to condensation products obtained by reaction of ingredients comprising an aldehyde and the specific triazine derivative embraced by Formula I that is named in the above illustrative examples. Thus, instead of para-hydroxyphenylamino diamino s-triazine (para-hydroxyanilino diamino s-triazine), I may use orthohydroxyphenylamino diamino s-triazine, meta-hydroxyphenylamino diamino s-triazine, a hydroxytolylamino diamino s-triazine or other hydroxyarylamino diamino s-triazines, a di-(hydroxyarylamino) amino s-triazine, a tri-(hydroxyarylamino) s-triazine, or any other triazine derivative of the kind embraced by Formula I, numerous examples of which have been given above and in my copending application Serial No. 453,716 by way of illustration.

In producing these new condensation products the choice of the aldehyde is dependent largely upon economic considerations and upon the particular properties desired in the finished product. I prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, heptaldehyde, octaldehyde, methacrolein, crotonaldehyde, benzaldehyde, furfural, hydroxyaldehydes (e. g., aldol, glucose, glycollic aldehyde, glyceraldehyde, etc.), mixtures thereof, or mixtures of formaldehyde (or compounds engendering formaldehyde) with such aldehydes. Illustrative examples of aldehyde-addition products that may be used instead of the aldehydes themselves are the mono- and poly-(N-carbinol) derivatives of urea, thiourea, selenourea and iminourea, and of substituted ureas, thioureas, selenoureas and iminoureas, mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of the aminodiazines, etc. Particularly good results are obtained with active methylene-containing bodies such as a methylol urea, more particularly mono- and di-methylol ureas, and a methylol melamine, e. g., monomethylol melamine and polymethylol melamines (di-, tri-, tetra-, penta- and hexamethylol melamines). Mixtures of aldehydes and aldehyde-addition products may be used, e. g., mixtures of formaldehyde and methylol compounds such, for instance, as dimethylol urea, trimethylol melamine, hexamethylol melamine, etc.

The ratio of the aldehydic reactant to the triazine derivative may be varied over a wide range depending, for example, upon the particular properties desired in the finished product. Ordinarily these reactants are employed in an amount corresponding to at least one mol of the aldehyde, specifically formaldehyde, for each mol of the triazine derivative. Thus, I may use, for example, from 1 to 9 or 10 or more mols of an aldehyde for each mol of the triazine derivative. When the aldehyde is available for reaction in the form of an alkylol derivative, more particularly a methylol derivative such, for instance, as dimethylol urea, trimethylol melamine, etc., then higher amounts of such aldehyde-addition products are used, for instance from 2 or 3 up to 20 or 25 or more mols of such alkylol derivatives for each mol of the triazine derivative.

As indicated hereinbefore, and as further shown by a number of the examples, the properties of the fundamental resins of this invention may be varied widely by introducing other modifying bodies before, during or after effecting condensation between the primary components. Thus, as modifying agents I may use, for example, methyl, ethyl, propyl, isopropyl, isobutyl, hexyl, etc., monohydric alcohols; polyhydric alcohols such, for example, as diethylene glycol, triethylene glycol, pentaerythritol, etc.; alcohol-ethers, e. g., ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, etc., amides, e. g., formamide, stearamide, acrylamide, benzene sulfonamides, toluene sulfonamides, adipic diamide, phthalamide, etc.; amines, e. g., ethylene diamine, phenylene diamine, etc.; ketones, including halogenated ketones, etc.; nitriles, including halogenated nitriles, e. g., acrylonitrile, methacrylonitrile, succinonitrile, chloroacetonitriles, etc.; acylated ureas, more particularly halogenated acylated ureas of the kind described, for example, in my Patent No. 2,281,559, issued May 5, 1942; and others.

The modifying bodies also may take the form of high molecular weight bodies with or without resinous characteristics, for example hydrolyzed wood products, formalized cellulose derivatives, lignin, protein-aldehyde condensation products, aminodiazine-aldehyde condensation products, aminotriazol-aldehyde condensation products, melamine-aldehyde condensation products, etc. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers, including polyvinyl acetals, specifically polyvinyl formal, etc.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide various thermoplastic and thermosetting molding compositions.

The modified and unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be used in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They may be employed for treating cotton, linen and other cellulosic materials in sheet or other form. They also may be used as impregnants for electrical coils and for other electrically insulating applications.

What I claim as new and desire to secure by Letters Patent of the United States is:

1. A composition comprising the resinous reaction product of (1) a chlorinated acetamide and (2) a product of partial reaction of ingredients including formaldehyde and a compound corresponding to the general formula

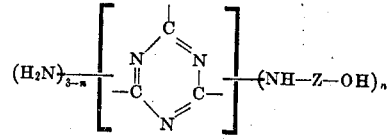

where $n$ represents an integer and is at least 1 and not more than 3, and Z represents a divalent aromatic hydrocarbon radical.

2. A composition comprising the resinous reaction product of (1) a chlorinated acetamide and (2) a product of partial reaction of ingredients including formaldehyde and a hydroxyphenylamino diamino s-triazine.

3. A composition comprising the resinous reaction product of (1) monochloroacetamide and (2) a product of partial reaction under alkaline conditions of ingredients including formaldehyde and para-hydroxyphenylamino diamino s-triazine.

GAETANO F. D'ALELIO.

REFERENCES CITED

The following references are of record in the file of this patent:

UNITED STATES PATENTS

| Number | Name | Date |
|---|---|---|
| 2,197,357 | Widmer | Apr. 16, 1940 |